United States Patent
Zhuge et al.

(10) Patent No.: US 12,469,193 B2
(45) Date of Patent: Nov. 11, 2025

(54) IMAGE PROCESSING METHOD AND APPARATUS, ELECTRONIC DEVICE, AND COMPUTER-READABLE STORAGE MEDIUM

(71) Applicant: BEIJING BYTEDANCE NETWORK TECHNOLOGY CO., LTD., Beijing (CN)

(72) Inventors: Jingjing Zhuge, Beijing (CN); Guangyao Ni, Beijing (CN); Yepeng Chen, Beijing (CN); Yanhao Shen, Beijing (CN); Hui Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 274 days.

(21) Appl. No.: 18/245,104

(22) PCT Filed: Aug. 13, 2021

(86) PCT No.: PCT/CN2021/112538
§ 371 (c)(1),
(2) Date: Mar. 13, 2023

(87) PCT Pub. No.: WO2022/083250
PCT Pub. Date: Apr. 28, 2022

(65) Prior Publication Data
US 2023/0377229 A1    Nov. 23, 2023

(30) Foreign Application Priority Data
Oct. 23, 2020    (CN) .......................... 202011143342.0

(51) Int. Cl.
*G06T 11/60*    (2006.01)
*G06T 11/00*    (2006.01)

(52) U.S. Cl.
CPC ............ *G06T 11/60* (2013.01); *G06T 11/001* (2013.01); *G06T 2210/62* (2013.01)

(58) Field of Classification Search
None
See application file for complete search history.

(56) References Cited

U.S. PATENT DOCUMENTS

| | | |
|---|---|---|
| 8,988,434 B1 | 3/2015 | Roth |
| 2008/0077866 A1 | 3/2008 | Margulis |
| 2011/0116553 A1 | 5/2011 | Kudou |

FOREIGN PATENT DOCUMENTS

| | | |
|---|---|---|
| CN | 102037494 A | 4/2011 |
| CN | 105631804 A | 6/2016 |

(Continued)

OTHER PUBLICATIONS

Written Opinion for International Application No. PCT/CN2021/112538, mailed Nov. 15, 2021, 10 pages.

(Continued)

*Primary Examiner* — Yanna Wu

(57) ABSTRACT

Provided are an image processing method, an image processing apparatus, an electronic device, and a computer-readable storage medium. The image processing method includes: obtaining a to-be-displayed text; generating a first base image comprising the to-be-displayed text; generating a second base image by determining, based on a display time parameter of the to-be-displayed text, a transparency of the to-be-displayed text in the first base image; generating, based on the second base image, a burr effect image of a to-be-displayed character; generating, based on the burr effect image, an external luminous effect image of the to-be-displayed character; obtaining a rendering image by superimposing the burr effect image and the external luminous effect image; and determining a transparency of a to-be-displayed character in the rendering image based on a (Continued)

position parameter of the to-be-displayed character in the to-be-displayed text, a time stamp, and the display time parameter of the to-be-displayed text.

20 Claims, 6 Drawing Sheets

(56) References Cited

FOREIGN PATENT DOCUMENTS

| | | | |
|---|---|---|---|
| CN | 106303659 A | 1/2017 | |
| CN | 107622504 A | 1/2018 | |
| CN | 107728916 A | 2/2018 | |
| CN | 107943964 A | 4/2018 | |
| CN | 110213504 A | 9/2019 | |
| CN | 110880164 A * | 3/2020 | ............. G06T 5/002 |
| CN | 111381754 A | 7/2020 | |
| CN | 112258611 A | 1/2021 | |
| EP | 1182617 A2 | 2/2002 | |

OTHER PUBLICATIONS

Office Action received for Chinese Patent Application No. 202011143342.0, mailed on Dec. 27, 2023, 13 pages (8 pages of English Translation and 5 pages of Original Document).
Search Report issued Nov. 15, 2021 for PCT Application No. PCT/CN2021/112538, English translation (6 pages).

* cited by examiner

IMAGE PROCESSING METHOD AND APPARATUS, ELECTRONIC DEVICE, AND COMPUTER-READABLE STORAGE MEDIUM

CROSS-REFERENCE TO RELATED APPLICATIONS

The present application claims priority to a Patent Application No. 202011143342.0, titled "IMAGE PROCESSING METHOD AND APPARATUS, ELECTRONIC DEVICE, AND COMPUTER-READABLE STORAGE MEDIUM", filed on Oct. 23, 2019 with China National Intellectual Property Administration, which is incorporated herein by reference in its entirety.

FIELD

The present disclosure relates to the technical field of image processing, and more particularly, to an image processing method, an image processing apparatus, an electronic device, and a computer-readable storage medium.

BACKGROUND

In recent years, a new media of short video, e.g., short-film video, has emerged. It is a way of spreading content on the Internet, which is generally spreading a video with duration within 5 minutes on the new media of the Internet. With the popularization of mobile terminals and the acceleration of the network, short, fast and large-flow communication content has increasingly gained the favor of major platforms, fans, and capital.

The short videos usually contain some character information such as lines or lyrics, which will be displayed with the displaying of the short videos. Currently, the corresponding character information is directly displayed when the short video is played to the image processing position, and thus the character information appears rigid and inflexible.

SUMMARY

This section of the present disclosure is provided to introduce in brief the concepts, which will be described in detail in the detailed description below. This section is neither intended to identify key or necessary features of the claimed technical solutions, nor intended to limit the scope of the claimed technical solutions.

The present disclosure provides an image processing method, to at least partially solves the technical problem in the related art, i.e., the inflexible and direct displaying of that character information. In addition, the present disclosure also provides an image-word processing apparatus, an image-word processing hardware device, a computer-readable storage medium, and an image-word processing terminal.

In order to achieve the above objects, according to one aspect of the present disclosure, the following technical solution is provided.

An image processing method is provided. The image processing method includes: obtaining a to-be-displayed text; generating a first base image comprising the to-be-displayed text; generating a second base image by determining, based on a display time parameter of the to-be-displayed text, a transparency of the to-be-displayed text in the first base image; generating, based on the second base image, a burr effect image of a to-be-displayed character; generating, based on the burr effect image, an external luminous effect image of the to-be-displayed character; obtaining a rendering image by superimposing the burr effect image and the external luminous effect image; and determining a transparency of a to-be-displayed character in the rendering image based on a position parameter of the to-be-displayed character in the to-be-displayed text, a time stamp, and the display time parameter of the to-be-displayed text.

In order to achieve the above objects, according to one aspect of the present disclosure, the following technical solution is provided.

An image word processing apparatus is provided. The image word processing apparatus includes: a text obtaining module configured to obtain a to-be-displayed text; a first base image generating module configured to generate a first base image comprising the to-be-displayed text; a second base image generating module configured to generate a second base image by determining, based on a display time parameter of the to-be-displayed text, a transparency of the to-be-displayed text in the first base image; a burr effect image generating module configured to generate, based on the second base image, a burr effect image of a to-be-displayed character; an external luminous effect image generating module configured to generate, based on the burr effect image, an external luminous effect image of the to-be-displayed character; a rendering image generating module configured to obtain a rendering image by superimposing the burr effect image and the external luminous effect image; and a character transparency determining module configured to determine a transparency of a to-be-displayed character in the rendering image based on a position parameter of the to-be-displayed character in the to-be-displayed text, a time stamp, and the display time parameter of the to-be-displayed text.

In order to achieve the above objects, according to one aspect of the present disclosure, the following technical solution is provided.

An electronic device is provided. The electronic device includes a memory having non-temporary computer-readable instructions stored thereon, and a processor. The non-temporary computer-readable instructions, when executed by the processor, cause the processor to implement the method as described above.

In order to achieve the above objects, according to one aspect of the present disclosure, the following technical solution is provided.

A computer-readable storage medium is provided. The computer-readable storage medium includes non-temporary computer-readable instructions. The non-temporary computer-readable instructions, when executed by a computer, cause the computer to implement the method as described above.

In order to achieve the above object, according to another aspect of the present disclosure, the following technical solution is further provided.

An image processing terminal is provided. The image processing terminal includes the image processing apparatus as described above.

The present disclosure discloses an image processing method, an image processing apparatus, an electronic device, and a computer-readable storage medium. The image processing method includes: obtaining a to-be-displayed text; generating a first base image comprising the to-be-displayed text; generating a second base image by determining, based on a display time parameter of the to-be-displayed text, a transparency of the to-be-displayed text in the first base image; generating, based on the second base image, a burr effect image of a to-be-displayed character; generating, based on the burr effect image, an external luminous effect image of the to-be-displayed character; obtaining a rendering image by superimposing the burr effect image and the external luminous effect image; and determining a transparency of a to-be-displayed character in the rendering image based on a position parameter of the to-be-displayed character in the to-be-displayed text, a time stamp, and the display time parameter of the to-be-displayed text. According to the embodiments of the present disclosure, the images can be displayed more dynamically and flexibly through the processing of the text image as descried above.

The above description is only an overview of the technical solutions of the present disclosure, which may be practiced in accordance with the contents of the specification in order to have a clearer understanding of the technical solutions of the present disclosure, for clearly explaining the above and other objects, features and advantages of the present disclosure. Preferred embodiments are set forth below and described in detail with reference to the accompanying drawings.

BRIEF DESCRIPTION OF THE DRAWINGS

The above and other features, advantages, and aspects of various embodiments of the present disclosure will become more apparent when taken in conjunction with the accompanying drawings and with reference to the detailed description below. Throughout the drawings, identical or similar reference numerals denote identical or similar elements. It should be understood that the drawings are schematic and that the components and elements are not necessarily drawn to scale.

DETAILED DESCRIPTION

Figure 1:
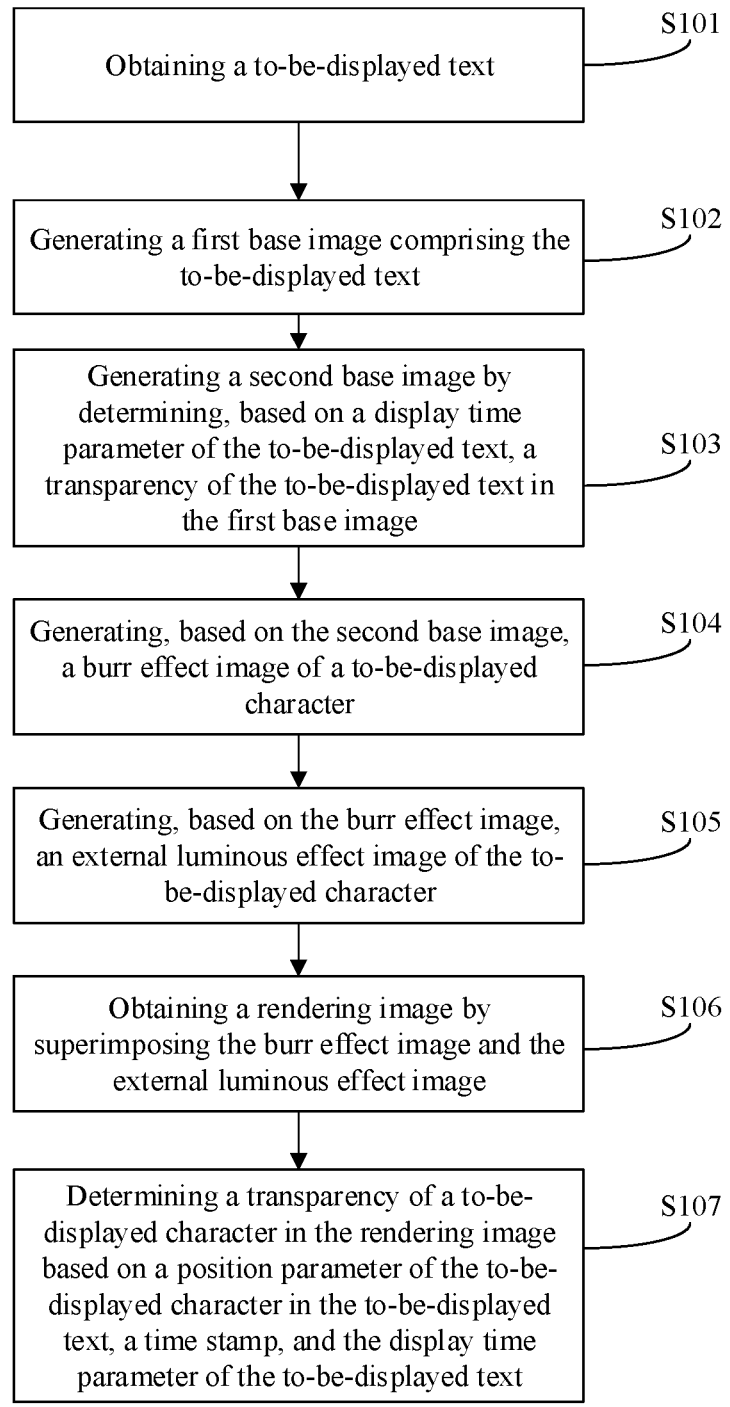
FIG. 1 is a schematic flowchart of an image processing method according to an embodiment of the present disclosure.
Figure 2:
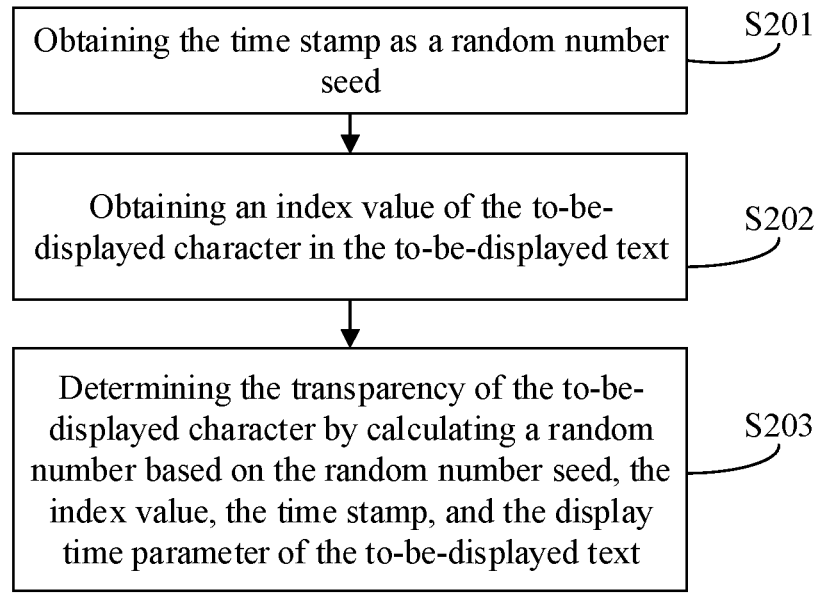
FIG. 2 is a further schematic flowchart of an image processing method according to an embodiment of the present disclosure.
Figure 3:
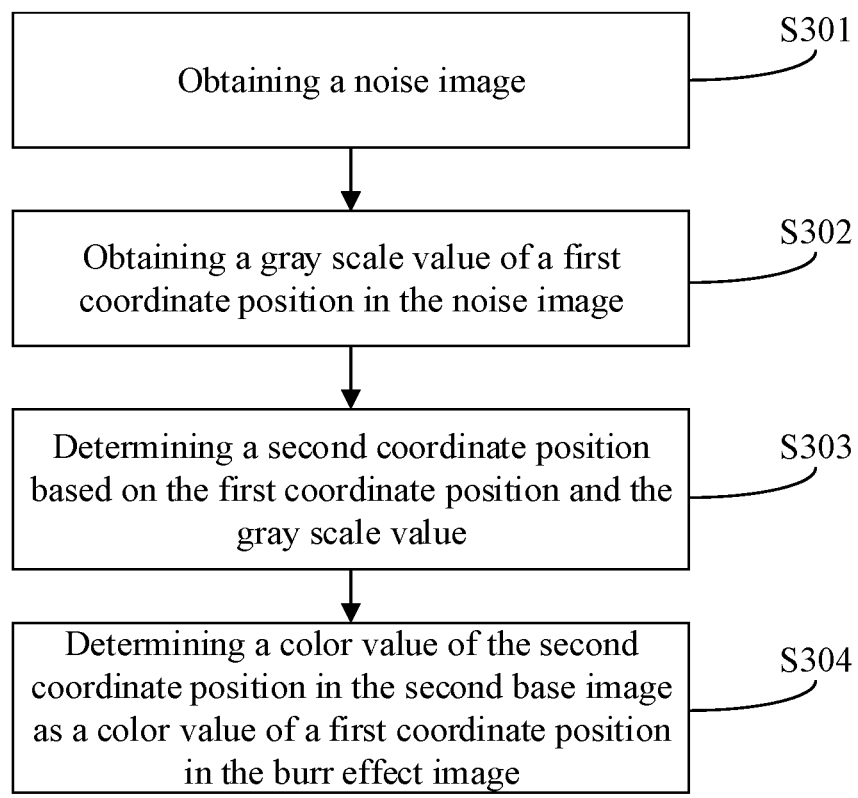
FIG. 3 is a further schematic flowchart of an image processing method according to one embodiment of the present disclosure.
Figure 4:
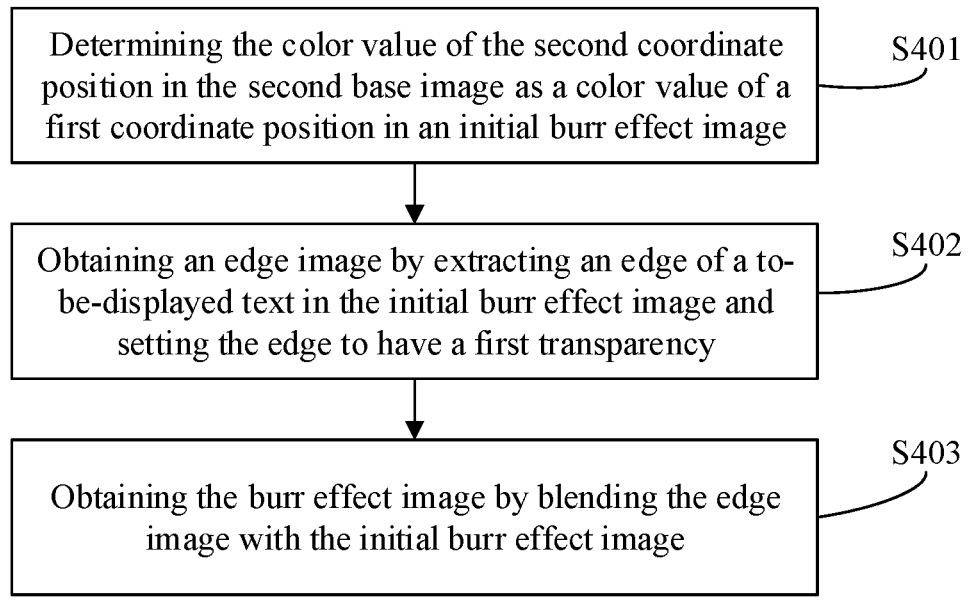
FIG. 4 is a further schematic flowchart of an image processing method according to one embodiment of the present disclosure.
Figure 5:
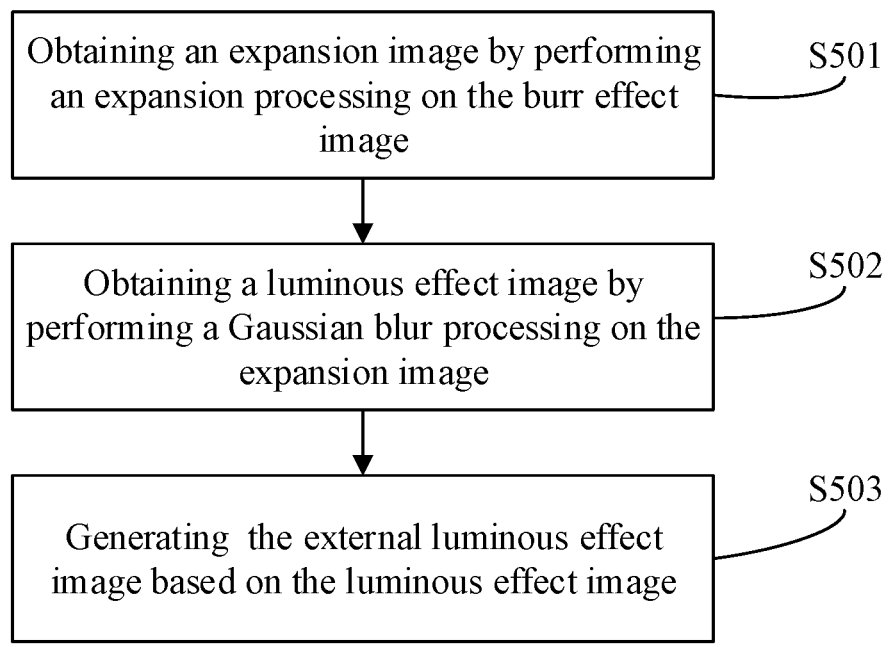
FIG. 5 is a further schematic flowchart of an image processing method according to one embodiment of the present disclosure.
Figure 6:
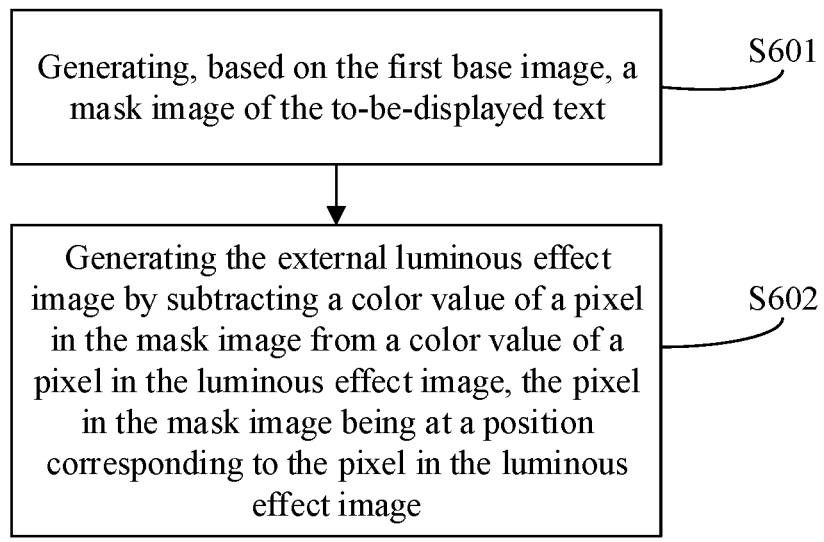
FIG. 6 is a further schematic flowchart of an image processing method according to one embodiment of the present disclosure.
Figure 7:
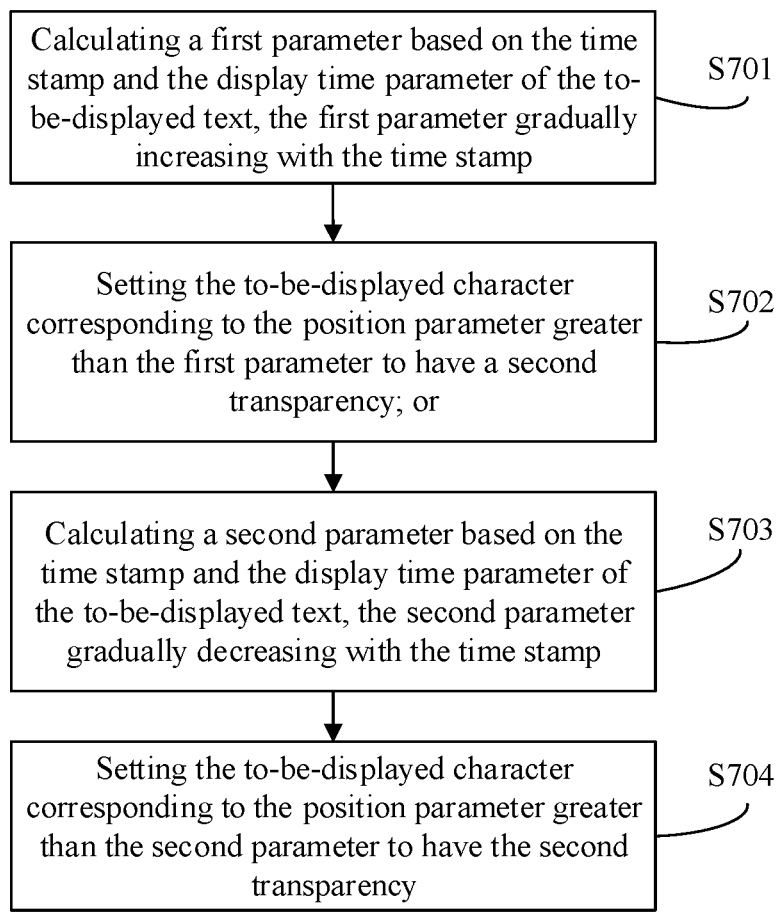
FIG. 7 is a further schematic flowchart of an image processing method according to one embodiment of the present disclosure.

Embodiments of the present disclosure will be described in more detail below with reference to the accompanying drawings. Although some embodiments of the present disclosure are illustrated in the drawings, it should be understood that the present disclosure can be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for illustration, rather than to limit the protection scope of the present disclosure.

It should be understood that steps described in the method embodiments of the present disclosure may be executed in different sequences and/or in parallel. In addition, method implementations may include additional steps and/or omit executions of the illustrated steps. The scope of the present disclosure is not limited in this respect.

The term "include" or "comprise" and its variants as used herein indicate open-ended inclusions, i.e., "includes, but not limited to". The term "based on" refers to "at least partially based on". The term "an embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish apparatuses, modules or units. They are neither used to limit that these apparatuses, modules or units are definitely different apparatuses, modules or units, nor used to limit a sequence or interdependence of functions performed by these apparatuses, modules or units.

It should be noted that modifications such as "a", "an" and "plurality of" mentioned in the present disclosure are schematic instead of restrictive, and should be construed as "one or more" by those skilled in the art, unless otherwise clearly indicated in the context.

FIG. 1 is a schematic flowchart of an image processing method according to an embodiment of the present disclosure. The image processing method provided by the embodiment can be executed by an image processing apparatus. The image processing apparatus may be implemented as software, or as a combination of software and hardware. The image processing apparatus may be integrated in a device in an image processing system, such as an image processing server or an image processing terminal device. As shown in FIG. 1, the method includes the following actions in blocks S101 to S107.

At block S101, to-be-displayed text is obtained.

The to-be-displayed text includes at least one to-be-displayed character. In an embodiment, the to-be-displayed text is a text file, and the at least one to-be-displayed character is stored in the text file. As an example, the text file includes a lyrics file, a subtitle file, and the like. In an embodiment, the to-be-displayed text is at least one to-be-displayed character received from a human-computer interaction interface, such as at least one to-be-displayed character that is received via a keyboard, a mouse, or a touch screen.

It can be understood that the above-mentioned manners for obtaining the to-be-displayed text are merely illustrative and do not constitute limitations on the present disclosure.

At block S102, a first base image including the to-be-displayed text is generated.

The first base image is an image in which a foreground is the to-be-displayed text and a background is transparent.

In an embodiment, the action in block S102 includes: typesetting a texture image of the to-be-displayed text based on a predetermined style and rendering the texture image in an image with a transparent background. The predetermined style includes a vertical typesetting or a horizontal typesetting, and the texture image is obtained from a set of character-texture images. The set of character-texture images includes an image file containing the to-be-displayed character and a texture position index table of the to-be-displayed character. The texture position index table includes a texture index value, e.g., a texture position, of the to-be-displayed character, and the texture position is a position of the to-be-displayed character in the set of character-texture images. The texture index value includes a Unicode of the to-be-displayed character. Based on the Unicode, the texture position of the texture of the to-be-displayed character in the set of character-texture images is searched for in the text position index table. The texture image of the to-be-displayed character is obtained based on the texture position, and then the texture image is typeset and rendered in the image with the transparent background based on the predetermined style.

At block S103, a second base image is generated by determining, based on a display time parameter of the to-be-displayed text, a transparency of the to-be-displayed text in the first base image.

The display time parameter includes a display start time and a display end time of the to-be-displayed text. The display start time indicates the time when the displaying of the to-be-displayed text starts, and the display end time indicates the time when the displaying of the to-be-displayed text ends. The display start time and the display end time can be an absolute time or a relative time. The absolute time includes a system time, for example, the display start time is at 10:26:25 on Oct. 15, 2020, and the display end time is at 10:27:25 on Oct. 15, 2020. That is, the display time of the to-be-displayed text can be directly determined based on the display start time and the display end time. The relative time includes a time offset. For example, when the text to be display is lyrics, the display start time and the display end time may be an offset value in the play time of a song. If the display start time of a line of the lyrics is at 10 seconds and the display end time of the lyric is at 20 seconds, based on a play start time T of the song, the actual display start time of the line of the lyrics is at T+10 seconds and the actual display end time of the line of the lyrics is at T+20 seconds.

In this action in block, the transparency of the to-be-displayed text in the first base image is determined based on the display time parameter of the to-be-displayed text. In an embodiment, the action in block S103 includes: determining the transparency of the to-be-displayed text based on a correspondence between the display time parameter and the transparency of the to-be-displayed text. As an example, each time point in a display period of the to-be-displayed text corresponds to a transparency, so that a time point of a current timestamp in the display period can be obtained based on the display time parameter of the to-be-displayed text, and the transparency of the to-be-displayed text can be obtained based on the time point.

In an embodiment, the action in block S103 includes the following actions in blocks.

At block S201, the time stamp is obtained as a random number seed.

At block S202, an index value of the to-be-displayed character in the to-be-displayed text is obtained.

At block S203, the transparency of the to-be-displayed character is determined by calculating a random number based on the random number seed, the index value, the time stamp, and the display time parameter of the to-be-displayed text.

In the above actions, a random number is used as the transparency of the to-be-displayed text, and thus the to-be-displayed text can have a flashing effect during the display period of the to-be-displayed text.

As an example, at block S201, the random number seed of a random function is first determined. In this embodiment, a time stamp, i.e., a current system time, is used as the random number seed.

At block S202, the index value of the to-be-displayed character in the to-be-displayed text is obtained. The index value of the to-be-displayed character is a position of the to-be-displayed character in the to-be-displayed text. If the to-be-displayed text is "I am a student of primary school" and the index of a word is calculated from 1, the index value of the word "a" in the to-be-displayed text is "3".

In an embodiment, at block S203, the random number seed is taken as the random number seed of the random function, the index value is taken as calling times of the random function, and a value range of the random function is limited by the time stamp and the display time parameter of the to-be-displayed text. As an example, the transparency of the to-be-displayed character is calculated based on the following equation (1):

$$\text{alpha} = \text{random}\left(\min\left(\frac{timestamp - startTime}{0.5 * (endTime - startTime)}, 1\right), 1\right), \quad (1)$$

where alpha represents the transparency; random represents the random function; timestamp represents the random number seed;

$$\min\left(\frac{timestamp - startTime}{0.5 * (endTime - startTime)}, 1\right)$$

represents a lower limit of the random function; endTime−startTime represents the display duration of the to-be-displayed text; and timestamp−startTime represents a duration in which the to-be-displayed text has been displayed. When timestamp−startTime exceeds half of the display duration, the value of $$\min\left(\frac{timestamp - startTime}{0.5 * (endTime - startTime)}, 1\right)$$

is always 1, and in this case, the transparency does not change. When timestamp−startTime does not exceed half of the display time, the transparency of the to-be-displayed character changes randomly. It can be understood that the parameter 0.5 in the above equation (1) can be set by those skilled in the art as desired. In addition, it will be understood that the random number seed and index value are not illustrated in the above equation, and that these two parameters are parameters of the random function. The random function, for example, is implemented by a linear congruence method, and can be implemented based on equation (2):

$$X(n+1) = (a*X(n)+b) \bmod c \quad (2),$$

where X(0) represents a random number seed; a, b and c are all constants; and n+1 represents the index value. The above equation (2) can generate random numbers ranging from 0 to c−1. Therefore, based on the index value of the to-be-displayed character in the to-be-displayed text, iteration times of the equation (2) can be determined, and then the transparency of the to-be-displayed character can be obtained. Thus, at each time point, the transparency of the to-be-displayed character in the to-be-displayed text is random. In addition, since the time stamp is used as the random number seed, the transparency obtained at each time point may be different, which greatly diversifies the display effects.

Further referring to FIG. 1, the image processing method according to the embodiment of the present disclosure further includes an action in block S104 of generating, based on the second base image, the burr effect image of the to-be-displayed character.

In an embodiment, the action in block S104 further includes the following actions in blocks.

At block S301, a noise image is obtained.

At block S302, a gray scale value of a first coordinate position in the noise image is obtained.

At block S303, a second coordinate position is determined based on the first coordinate position and the gray scale value.

At block S304, a color value of the second coordinate position in the second base image is determined as a color value of a first coordinate position in the burr effect image.

In an embodiment, the noise image is a random gray scale image, that is, the gray scale value of each pixel point on the noise image is a random value. As an example, the noise image may be a Berlin noise image.

At block S302, a gray scale value of a first coordinate position in the noise image is obtained. Assuming that the coordinates of the first coordinate position are (x, y), the gray scale value of the (x, y) point on the noise image is sampled, and the gray scale value is recorded as diffX. Then, diffX is obtained by the following equation (3):

$$\text{diffX}=\text{Sample}(\text{noiseImg},(x,y)) \quad (3),$$

where Sample represents a sampling operation, noiseImg represents the noise image, and the gray scale value is obtained to be [0, 1] by sampling.

At block S303, a second coordinate position is determined based on the first coordinate position and the gray scale value. At this block, the gray scale value is used as a parameter for calculating the second coordinate position. As an example, diffX is taken as an offset value of the x coordinate to obtain the coordinates of the second coordinate position, i.e., (x+diffX, y); or diffX is taken as the offset value of the Y coordinate to obtain the coordinates of the second coordinate position i.e., (x, y+diffX); or diffX is taken as a multiplier of the x coordinate to obtain the coordinates of the second coordinate position i.e., (x*diffX, y). It can be understood that the use of the diffX described above is by way of example only and does not constitute a limitation on the present disclosure. For the convenience of expression, diffX is used as the offset value of the x coordinate.

At block S304, a color value of the second coordinate position in the second base image is assigned to the pixel of the first coordinate position in the burr effect image. As an example, the color of the pixel in the burr effect image is obtained based on the following equation (4):

$$\text{Color}(x,y)=\text{Sample}(\text{ori Img},(x+\text{diffX},y)) \quad (4)$$

where Color(x, y) represents a color of the first coordinate position (x, y) in the burr image effect; oriImg represents the second base image; (x+diffX,y) represents the second coordinate position. In this way, the burr effect image of the to-be-displayed text can be obtained.

In an embodiment, the action in block S304 further includes the following actions in blocks.

At block S401, the color value of the second coordinate position in the second base image is determined as a color value of a first coordinate position in an initial burr effect image.

At block S402, an edge image is obtained by extracting an edge of a to-be-displayed text in the initial burr effect image and the edge is set to have a first transparency. In an embodiment, the first transparency may be determined as opaque.

At block S403, the burr effect image is obtained by blending the edge image with the initial burr effect image.

The actions in blocks S401 to S403 described above describe the actions of strengthening the burr effect. At block S401, a burr effect image is obtained in the same manner as at block S304, but the burr effect image obtained at block S401 is an initial burr effect image. At block S402, an edge of the to-be-displayed text in the initial burr effect image is extracted with any edge extraction algorithm, which is not limited herein. In an embodiment, after obtaining the edge of the to-be-displayed text, the first transparency of the edge is determined to be 1, i.e., opaque, to obtain an edge image including only the edge of the to-be-displayed text. At block S403, the edge image and the initial burr effect image are blended to obtain the burr effect image. In this embodiment, the blending is to cover the edge image on the initial burr effect image. Since the pixels at other positions in the edge image are transparent except the edge of the to-be-displayed text, the effect of the burr part of the to-be-displayed text can be enhanced while the other positions remain unchanged. It will be understood that the first transparency may also be determined to be other values to achieve different effects, which will not be elaborated here.

Further referring to FIG. 1, the image processing method according to the embodiment of the present disclosure further includes the action in block S105 of generating, based on the burr effect image, the external luminous effect image of the to-be-displayed character.

In an embodiment, the action in block S105 further includes the following actions in blocks.

At block S501, an expansion image is obtained by performing an expansion processing on the burr effect image.

At block S502, a luminous effect image is obtained by performing a Gaussian blur processing on the expansion image.

At block S503, the external luminous effect image is generated based on the luminous effect image.

In order to obtain the external luminous effect image, the expansion image is obtained by performing the expansion processing on the burr effect image. The expansion processing can be a processing that a color value is added to the edge of the image to enable the overall color value to be expanded, to realize an expansion effect of the image. In the above actions, the color value is added to the edge of the burr effect image, and the burr effect image is expanded outwards. As an example, a 5*5 expansion processing is performed on the burr effect image. For example, the color value of the edge of the burr effect image is selected as the expansion color, and pixels in an area 5*5 outside the edge are assigned with the expansion color to obtain the expansion image. After the expansion image is obtained, the Gaussian blur processing is performed on the expansion image. For example, the Gaussian blur processing is performed on the expansion image twice, allowing the edge color of the to-be-displayed text in the expansion image to diverge, thereby obtaining the luminous effect image. After obtaining the luminous effect image, a part of the to-be-displayed text in an area located at the inner side of the edge in the luminous effect image is cut out to obtain the to-be-displayed text including only the luminous part, so as to obtain the external luminous effect image.

In an embodiment, the action in block S503 further includes the following actions in blocks.

At block S601, a mask image of the to-be-displayed text is generated based on the first base image.

At block S602, the external luminous effect image is generated by subtracting a color value of a pixel in the mask image from a color value of a pixel in the luminous effect image, the pixel in the mask image being at a position corresponding to the pixel in the luminous effect image.

At block S601, the mask image of the to-be-displayed text is generated, in which the to-be-displayed text in the mask image is white, the background is black, and the transparency is 1. The first base image originally only includes the to-be-displayed text, and thus the mask image of the to-be-displayed text can be obtained by performing a binarization processing on the first base image.

The mask image can be used to perform a cutout processing on the image with the to-be-displayed text. At block S602, the color value of the pixel in the mask image is subtracted from the color value of the pixel in the luminous effect image, the pixel in the mask image being at the position corresponding to the pixel in the luminous effect image. From the definition of the mask image, it is known that the to-be-displayed text in the mask image is white with a transparency of 1, and other positions are black with a transparency of 0. Then, the transparency of the luminous effect image corresponding to the to-be-displayed text in the mask image is smaller than or equal to 0 after calculation, and the luminous effect image will be truncated to 0 finally, so that the position corresponding to the to-be-displayed text in the mask image is transparent. A luminous effect part in the luminous effect image is obtained from the burr effect image, the transparency of the edge part in the burr effect image is 1, and the transparency of the position corresponding to the edge part in the mask image is 0, such that the transparency of the luminous effect part of the edge of the to-be-displayed character after subtraction is 1, and the luminous effect part is retained to obtain the external luminous effect image.

It can be understood that after the above actions, the external luminous effect image and a predetermined background image can also be superimposed to obtain the external luminous effect image with the background image, which will not be elaborated here.

Further referring to FIG. 1, the image processing method according to the embodiment of the present disclosure further includes the action in block S106 of obtaining a rendering image by superimposing the burr effect image and the external luminous effect image.

The external luminous effect image only includes the luminous effect part. Therefore, the burr effect image and the external luminous effect are superimposed in this action. Since an external luminous part is not included in the burr effect image, the burr effect image can be filled into the area corresponding to the to-be-displayed text in the external luminous effect image, thereby eliminating the influence of the processing at block S105 on the to-be-displayed text. In this way, the external luminous effect can be obtained while the to-be-displayed text is kept clear in the rendering image.

At block S107, a transparency of a to-be-displayed character in the rendering image is determined based on a position parameter of the to-be-displayed character in the to-be-displayed text, a time stamp, and the display time parameter of the to-be-displayed text.

At this block, the transparency of the to-be-displayed character in the to-be-displayed text is determined based on the position parameter of the to-be-displayed character, the time stamp, and the display time parameter of the to-be-displayed text, thereby producing rich effects.

In an embodiment, the block S107 provides an effect that the to-be-displayed text gradually appears or disappears. The action in block S107 further includes the following actions in blocks.

At block S701, a first parameter is calculated based on the time stamp and the display time parameter of the to-be-displayed text, the first parameter gradually increasing with the time stamp.

At block S702, the to-be-displayed character corresponding to the position parameter greater than the first parameter is set to have a second transparency.

Alternatively, at block S703, a second parameter is calculated based on the time stamp and the display time parameter of the to-be-displayed text, the second parameter gradually decreasing with the time stamp.

At block S704, the to-be-displayed character corresponding to the position parameter greater than the second parameter is set to have the second transparency.

In the actions in block S701 and block S702, the first parameter gradually increasing with time is calculated, and the transparency of the to-be-displayed character whose position parameter larger than the first parameter is set to have the second transparency (e.g., transparent), so as to generate an effect that the to-be-displayed character appears one by one.

For example, at block S702, the position parameter of the to-be-displayed character is $y_{char}$, when:

$$y_{char} > \frac{timestamp - startTime}{d*(endTime - startTime)} * Height,$$

the transparency of the to-be-displayed character corresponding to $y_{char}$ is determined to be 0, where $0<d\leq1$. As an example, the to-be-displayed text is a vertically typeset sentence, "I am a student of primary school", $y_{char}$ represents a relative height of the to-be-displayed character in the to-be-displayed text. If the downward direction is a positive direction, the relative height of "I" is 0, the relative height of "am" is $1/7$, and so on, and the relative height of "primary" is $6/7$. The above parameter Height represents a height of the to-be-displayed text. In this example, Height=7. In this example, at the beginning, the transparency of the to-be-displayed characters of $y_{char}>0$ is 0, that is, only "I" is displayed in this case, and the transparency of "I" is determined by the transparency in the above action in block S103. Thereafter, the first parameter $$\frac{timestamp - startTime}{d*(endTime - startTime)} * Height$$

gradually increases with time, and the to-be-displayed characters in the to-be-displayed text are displayed one by one until all the to-be-displayed characters in the to-be-displayed text are displayed. The speed of displaying the to-bedisplayed characters one by one can be adjusted based on the first parameter. For example, if d=0.2, the to-be-displayed characters in the to-be-displayed text will be displayed one by one within 0.2 times of the display time length. If d=0.5, the characters to be displayed in the to-be-displayed text will be displayed one by one within 0.5 times of the display time length. In can be understood that the above Height can be replaced by the length Width of the to-be-displayed character in horizontal typesetting, and in this case, $y_{char}$ is required to be replaced by the position parameter $x_{char}$ of the to-be-displayed character in horizontal direction, which will not be elaborated here.

In the actions in block S703 and block S704, the second parameter gradually decreasing with time is calculated, and the transparency of the to-be-displayed character whose position parameter is larger than the second parameter is set to be the second transparency (e.g., transparent) to generate an effect that the to-be-displayed character disappears one by one.

As an example, at block S704, the position parameter of the to-be-displayed character is $y_{char}$, then when:

$$y_{char} > \frac{endTime - timestamp}{d*(endTime - startTime)} * Height,$$

the transparency of the to-be-displayed character corresponding to $y_{char}$ is determined to be 0, where 0<d≤1. As an example, the to-be-displayed text is a vertically typeset sentence, "I am a student of primary school", $y_{char}$ represents a relative height of the to-be-displayed character in the to-be-displayed text. If the downward direction is a positive direction, the relative height of "I" is 0, the relative height of "am" is ⅟₇, and so on, and the relative height of "primary" is ⁶⁄₇. The above parameter Height represents the height of the to-be-displayed character. In this example, Height=7. In this example, at the beginning, the transparency of the to-be-displayed characters of $$y_{char} > \frac{1}{d} * Height \text{ is } 0, \text{ since } 0 < d \leq 1, \frac{1}{d} * Height \geq Height.$$

That is, at this time, all the words to be displayed in the to-be-displayed text are displayed. Thereafter, the first parameter $$\frac{endTime - timestamp}{d*(endTime - startTime)} * Height$$

gradually decreases with time, and the characters to be displayed in the to-be-displayed text disappear one by one. The speed of displaying characters to be displayed one by one can be adjusted based on the first parameter. For example, if d=0.2, the characters to be displayed in the to-be-displayed text will disappear one by one within 0.2 times of the display time length. If d=0.5, the characters to be displayed in the to-be-displayed text will disappear one by one within 0.5 times of the display time length. In can be understood that the above Height can be replaced by the length Width of the to-be-displayed character in horizontal typesetting, and in this case, $y_{char}$ is required to be replaced by the position parameter $x_{char}$ of the to-be-displayed character in horizontal direction, which will not be elaborated here.

Through the combination of the above two conditions:

$$y_{char} > \frac{timestamp - startTime}{d*(endTime - startTime)} * Height \text{ or }$$

$$y_{char} > \frac{endTime - timestamp}{d*(endTime - startTime)} * Height,$$

the transparency of the to-be-displayed character corresponding to $y_{char}$ is determined to be 0, that is, the effect that the to-be-displayed character appears and disappears one by one can be realized.

The above actions in blocks S101 to S107 describe a process of generating a rendering image. In order to achieve a dynamic effect, it is necessary to generate a rendering image at each time stamp to form a plurality of frame images in a video. Therefore, optionally, the method further includes: generating a plurality of rendering images based on the time stamp. The plurality of rendering images is a plurality of frame images in a video.

The rendering image is generated at a time point determined by each time stamp, and thus a plurality of rendering images is played in accordance with the order of time stamps, providing a video effect.

Figure 8:
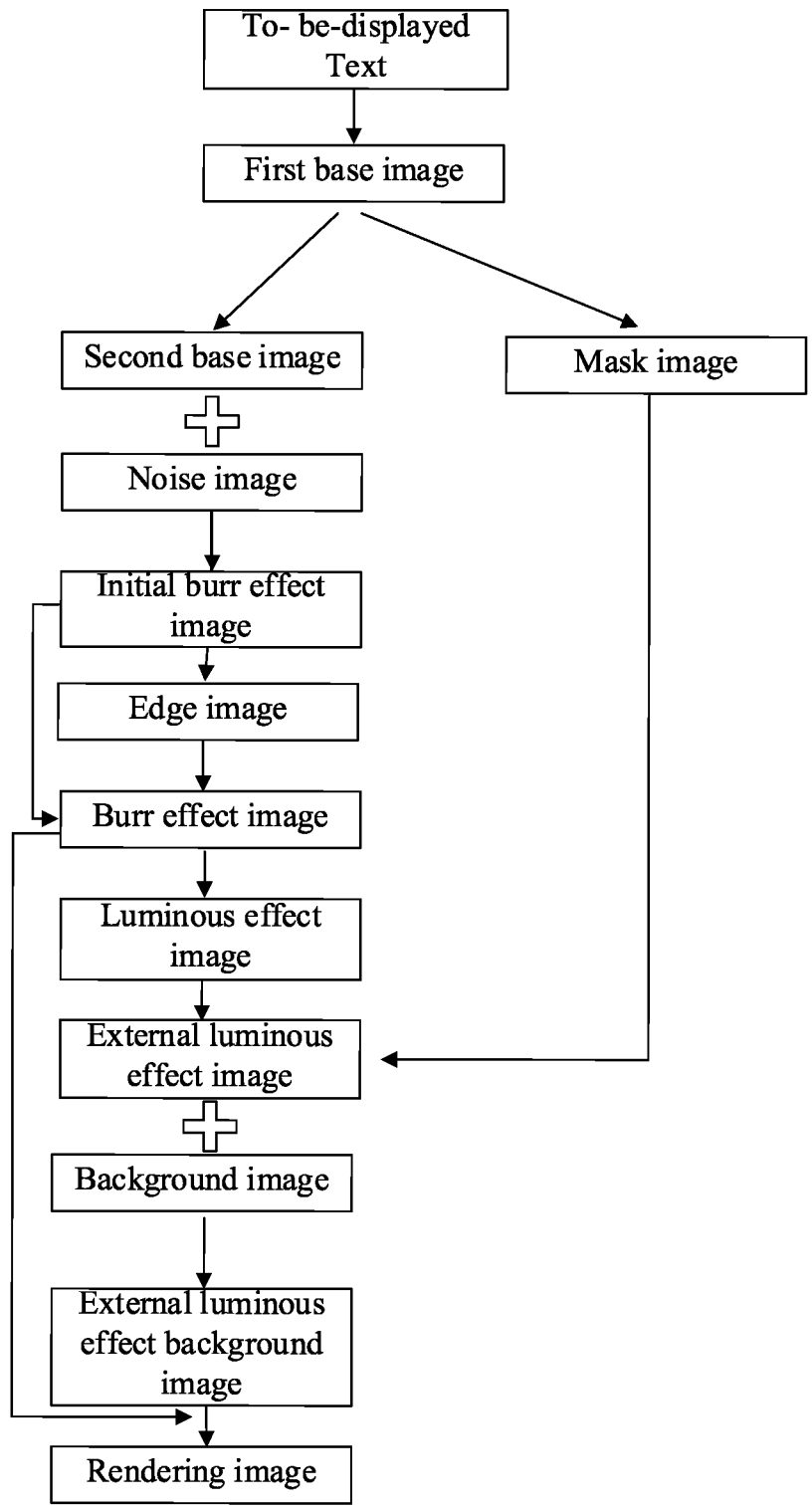
FIG. 8 is a schematic diagram of an application example of an image processing method according to an embodiment of the present disclosure.

FIG. 8 is a schematic diagram of an application example of an image processing method according to an embodiment of the present disclosure. As illustrated in FIG. 8, to-be-displayed text is obtained; after the to-be-displayed text is obtained, a first base image having a transparent background and including the to-be-displayed text is generated; a mask image and a second base image are generated based on the first base image; an initial burr effect image is generated based on the second base image and a noise image, an edge image of the initial burr effect image is extracted, and after the transparency of an edge of the edge image is determined to be 1, the edge image and the initial burr effect image are blended to obtain a burr effect image; a luminous effect image is obtained by performing an expansion processing and Gaussian blur processing on the burr effect image; an external luminous effect image is obtained by subtracting the mask image from the luminous effect image; in order to diversify the final display effect, after the external luminous effect image is obtained, an external luminous effect background image is obtained by blending the external luminous effect image with the background image; finally, a rendering image is obtained by superimposing the burr effect image and the external luminous effect background image. It can be understood that the transparency of the to-be-displayed character in the rendering image can be set by the processing in block S107 after the rendering image is obtained, thereby producing the effect that the to-be-displayed characters appear or disappear one by one. The specific implementations of the actions in the above application example can be referred to the above embodiments and will not be elaborated here.

The present disclosure discloses an image processing method. The method includes: obtaining the to-be-displayed text; generating a first base image including the to-be-displayed text; generating a second base image by determining, based on a display time parameter of the to-be-displayed text, a transparency of the to-be-displayed text in the first base image; generating, based on the second base image, a burr effect image of a to-be-displayed character; generating, based on the burr effect image, an external luminous effect image of the to-be-displayed character; obtaining a rendering image by superimposing the burr effect image and the external luminous effect image; and determining a transparency of a to-be-displayed character in the rendering image based on a position parameter of the to-be-displayed character in the to-be-displayed text, a time stamp, and the display time parameter of the to-be-displayed text. According to the embodiments of the present disclosure, the images can be displayed more dynamically and flexibly through the processing of the text images as descried above.

In the above, although the actions in the above method embodiments are described in the above-mentioned order, it is apparent to those skilled in the art, the actions in embodiments of the present disclosure are not necessarily performed in the above-mentioned order, and they may also be executed in other orders such as a reverse order, a parallel order, an order crossing, etc. On the basis of the above actions, other actions can be added by those skilled in the art. These obvious variations or equivalent substitutions should also fall within the scope of protection of the present disclosure, which will not be elaborated herein.

Figure 9:
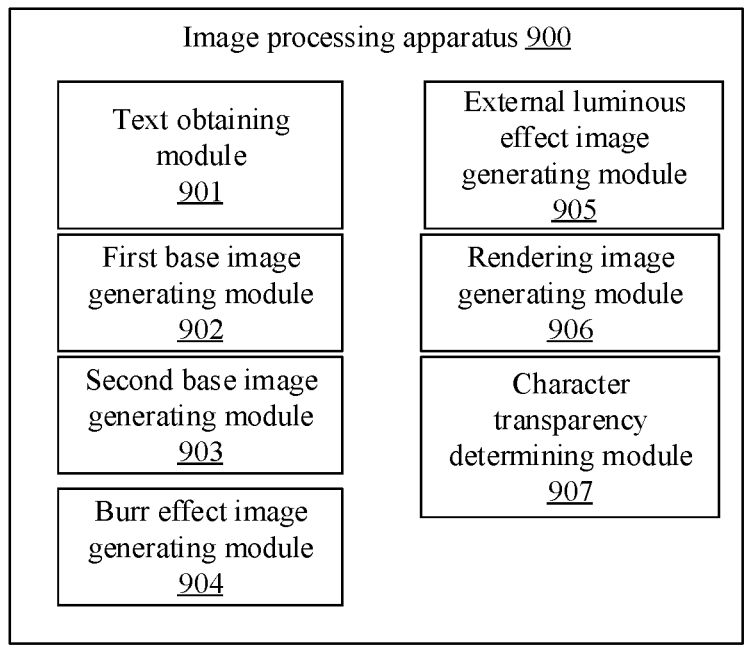
FIG. 9 is a schematic block diagram of an image processing apparatus according to an embodiment of the present disclosure.

FIG. 9 is a schematic block diagram of an image processing apparatus according to an embodiment of the present disclosure. As illustrated in FIG. 9, the apparatus 900 includes a text obtaining module 901, a first base image generating module 902, a second base image generating module 903, a burr effect image generating module 904, an external luminous effect image generating module 905, a rendering image generating module 906, and a character transparency determining module 907.

The text obtaining module 901 is configured to obtain a to-be-displayed text.

The first base image generating module 902 is configured to generate a first base image including the to-be-displayed text.

A second base image generating module 903 is configured to generate a second base image by determining, based on a display time parameter of the to-be-displayed text, a transparency of the to-be-displayed text in the first base image.

The burr effect image generating module 904 is configured to generate, based on the second base image, a burr effect image of a to-be-displayed character.

The external luminous effect image generating module 905 is configured to generate, based on the burr effect image, an external luminous effect image of the to-be-displayed character.

The rendering image generating module 906 is configured to obtain a rendering image by superimposing the burr effect image and the external luminous effect image.

The character transparency determining module 907 is configured to determine a transparency of a to-be-displayed character in the rendering image based on a position parameter of the to-be-displayed character in the to-be-displayed text, a time stamp, and the display time parameter of the to-be-displayed text.

Further, the second base image generation module 903 is further configured to: obtain the time stamp as a random number seed; obtain an index value of the to-be-displayed character in the to-be-displayed text; and determine the transparency of the to-be-displayed character by calculating a random number based on the random number seed, the index value, the time stamp, and the display time parameter of the to-be-displayed text.

Further, the burr effect image generating module 904 is further configured to: obtain a noise image; obtain a gray scale value of a first coordinate position in the noise image; determine a second coordinate position based on the first coordinate position and the gray scale value; and determine a color value of the second coordinate position in the second base image as a color value of a first coordinate position in the burr effect image.

Further, the burr effect image generating module 904 is further configured to: determine the color value of the second coordinate position in the second base image as a color value of a first coordinate position in an initial burr effect image; obtain an edge image by extracting an edge of a to-be-displayed text in the initial burr effect image and set the edge to have a first transparency; and obtain the burr effect image by blending the edge image with the initial burr effect image.

Further, the external luminous effect image generating module 905 is further configured to: obtain an expansion image by performing an expansion processing on the burr effect image; obtain a luminous effect image by performing a Gaussian blur processing on the expansion image; and generate the external luminous effect image based on the luminous effect image.

Further, external luminous effect image generating module 905 is further configured to: generate, based on the first base image, a mask image of the to-be-displayed text; and generate the external luminous effect image by subtracting a color value of a pixel in the mask image from a color value of a pixel in the luminous effect image, the pixel in the mask image being at a position corresponding to the pixel in the luminous effect image.

Further, the character transparency determining module 907 is further configured to: calculate a first parameter based on the time stamp and the display time parameter of the to-be-displayed text, the first parameter gradually increasing with the time stamp, and set the to-be-displayed character corresponding to the position parameter greater than the first parameter to have a second transparency; or the character transparency determining module 907 is further configured to: calculate a second parameter based on the time stamp and the display time parameter of the to-be-displayed text, the second parameter gradually decreasing with the time stamp, and set the to-be-displayed character corresponding to the position parameter greater than the second parameter to have the second transparency.

Further, the image processing apparatus 900 is further configured to: generate a plurality of rendering images based on the time stamp. The plurality of rendering images is a plurality of frame images in a video.

The image processing apparatus illustrated in FIG. 9 may perform the method of the embodiments illustrated in FIG. 1 to FIG. 7, and for parts of this embodiment not described in detail, reference may be made to the relevant description of the embodiments illustrated in FIG. 1 to FIG. 7. The execution processes and technical effects of the technical solutions are described in the embodiments illustrated in FIG. 1 to FIG. 7, which will not be elaborated herein.

Figure 10:
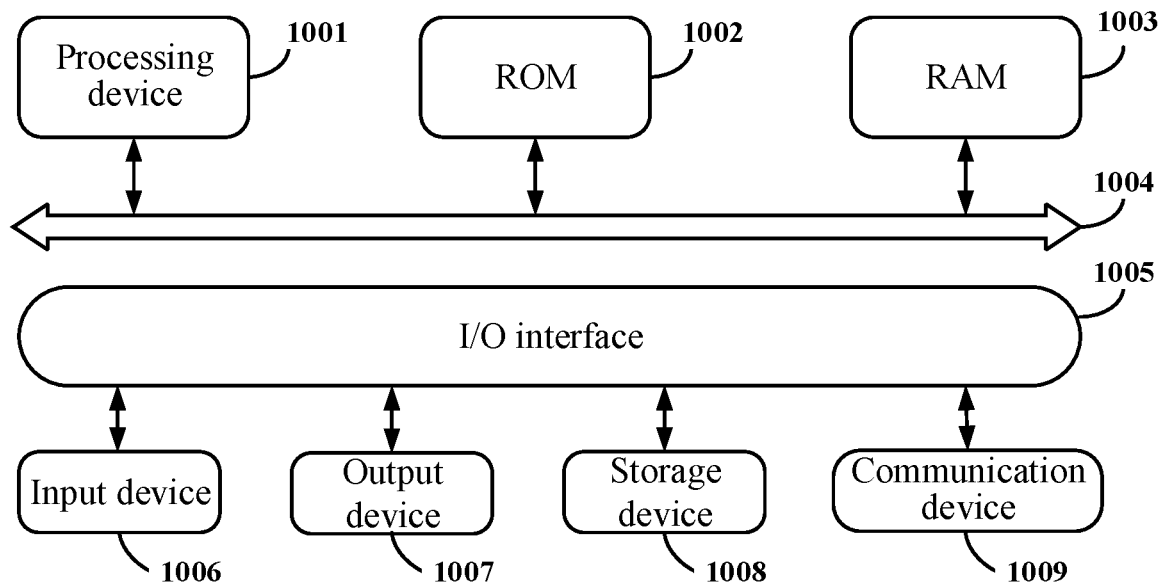
FIG. 10 is a schematic structural diagram of an electronic device according to an embodiment of the present disclosure.

FIG. 10 is a schematic structural diagram of an electronic device (e.g., a terminal device or server) 1000 suitable for implementing embodiments of the present disclosure. Referring to FIG. 10, the terminal device according to the embodiment of the present disclosure may include, but not limited to, a mobile terminal such as a mobile phone, a laptop computer, a digital broadcast receiver, a personal digital assistant (PDA), a portable Android device (PAD), a Portable Multimedia Player (PMP), or a vehicle-mounted terminal (e.g., a vehicle-mounted navigation terminal), a wearable device, or a fixed terminal such as a digital TV, a desktop computer, and smart home device, etc. The electronic device illustrated in FIG. 10 is exemplary only, and should not be construed as limiting the function and scope of use of the embodiments of the present disclosure.

As illustrated in FIG. 10, the electronic device 1000 may include a processing device (such as a central processing unit, a graphics processing unit, etc.) 1001, which may perform various appropriate actions and processes in accordance with programs stored in a Read-Only Memory (ROM) 1002 or loaded from a storage device 1008 into a Random Access Memory (RAM) 1003, thereby implementing the image processing method according to the embodiments of the present disclosure. In the RAM 1003, various programs and data required for operation of the electronic device 1000 may also be stored. The processing device 1001, the ROM 1002, and the RAM 1003 are connected to each other through a bus 1004. An Input/Output (I/O) interface 1005 is also connected to the bus 1004.

Generally, an input device 1006, an output device 1007, a storage device 1008, and a communication device 100 may be connected to the I/O interface 1005. The input device 1006 includes, for example, a touch screen, a touch pad, a keyboard, a mouse, a camera, a microphone, an accelerometer, a gyroscope, etc. The output device 1007 includes, for example, a Liquid Crystal Display (LCD), a speaker, an oscillator, etc. The storage device 1008 includes, for example, a magnetic tape or a hard disk; and a communication device 1009. The communication device 1009 may allow the electronic device 1000 to perform wireless or wired communication with other devices for data exchange. Although FIG. 10 illustrates that the electronic device 1000 includes various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure provides a computer program product, which includes a computer program carried on a non-transitory computer-readable medium. The computer program includes program codes for implementing the method illustrated in any of the flowcharts to implement the image processing method according to the embodiments of the present disclosure. In these embodiments, the computer program may be downloaded and installed from a network through the communication device 1009, or installed from the storage device 1008, or installed from the ROM 1002. When the computer program is executed by the processing device 1001, the above-mentioned functions defined in the methods according to the embodiments of the present disclosure are performed It should be noted that in the present disclosure, the above-mentioned computer-readable medium may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, an RAM, an ROM, an Electrical Programmable Read-Only Memory (EPROM) or a flash memory, an optical fiber, a Compact Disc ROM (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal transmitted in a baseband or as a part of a carrier that carries computer-readable program codes. The transmitted data signal may be in various forms, including but not limited to, an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server may communicate using any currently-known or future-developed network protocol, such as HyperText Transfer Protocol (HTTP), and the client and the server may be in communication interconnection with digital data in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently-known or future-developed network.

The above computer-readable medium may be included in the above electronic device or standalone without being assembled into the electronic device.

The above computer-readable medium may carry one or more programs. The one or more programs, when executed by the electronic device, cause the terminal device to perform the image processing method as described above.

The computer program codes for implementing the operations of the present disclosure may be written in one or more programming languages or any combination thereof. The programming languages may include, but not limited to, object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order illustrated in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure can be implemented in software or hardware. Here, a name of a unit does not constitute a limitation on the unit itself under certain circumstances.

The functions described above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combinations thereof. More specific examples of a machine-readable storage medium would include an electrical connection having one or more wires, a portable computer disk, a hard disk, an RAM, an ROM, an EPROM or a flash memory, an optical fiber, a CD-ROM, an optical memory device, a magnetic memory device, or any suitable combination thereof.

According to one or more embodiments of the present disclosure, an image processing method is provided. The method includes: obtaining a to-be-displayed text; generating a first base image including the to-be-displayed text; generating a second base image by determining, based on a display time parameter of the to-be-displayed text, a transparency of the to-be-displayed text in the first base image; generating, based on the second base image, a burr effect image of a to-be-displayed character; generating, based on the burr effect image, an external luminous effect image of the to-be-displayed character; obtaining a rendering image by superimposing the burr effect image and the external luminous effect image; and determining a transparency of a to-be-displayed character in the rendering image based on a position parameter of the to-be-displayed character in the to-be-displayed text, a time stamp, and the display time parameter of the to-be-displayed text.

Further, said generating the second base image by determining, based on the display time parameter of the to-be-displayed text, the transparency of the to-be-displayed text in the first base image includes: obtaining the time stamp as a random number seed; obtaining an index value of the to-be-displayed character in the to-be-displayed text; and determining the transparency of the to-be-displayed character by calculating a random number based on the random number seed, the index value, the time stamp, and the display time parameter of the to-be-displayed text.

Further, said generating, based on the second base image, the burr effect image of the to-be-displayed character includes: obtaining a noise image; obtaining a gray scale value of a first coordinate position in the noise image; determining a second coordinate position based on the first coordinate position and the gray scale value; and determining a color value of the second coordinate position in the second base image as a color value of a first coordinate position in the burr effect image.

Further, said determining the color value of the second coordinate position in the second base image as the color value of the first coordinate position in the burr effect image includes: determining the color value of the second coordinate position in the second base image as a color value of a first coordinate position in an initial burr effect image; obtaining an edge image by extracting an edge of a to-be-displayed text in the initial burr effect image and setting the edge to have a first transparency; and obtaining the burr effect image by blending the edge image with the initial burr effect image.

Further, said generating, based on the burr effect image, the external luminous effect image of the to-be-displayed character includes: obtaining an expansion image by performing an expansion processing on the burr effect image; obtaining a luminous effect image by performing a Gaussian blur processing on the expansion image; and generating the external luminous effect image based on the luminous effect image.

Further, said generating the external luminous effect image based on the luminous effect image includes: generating, based on the first base image, a mask image of the to-be-displayed text; and generating the external luminous effect image by subtracting a color value of a pixel in the mask image from a color value of a pixel in the luminous effect image, the pixel in the mask image being at a position corresponding to the pixel in the luminous effect image.

Further, said determining the transparency of the to-be-displayed character based on the position parameter of the to-be-displayed character in the to-be-displayed text, the time stamp, and the display time parameter of the to-be-displayed text includes: calculating a first parameter based on the time stamp and the display time parameter of the to-be-displayed text, the first parameter gradually increasing with the time stamp, and setting the to-be-displayed character corresponding to the position parameter greater than the first parameter to have a second transparency; or calculating a second parameter based on the time stamp and the display time parameter of the to-be-displayed text, the second parameter gradually decreasing with the time stamp, and setting the second transparency, the to-be-displayed character corresponding to the position parameter greater than the second parameter to have the second transparency.

Further, the method further includes: generating a plurality of rendering images based on the time stamp, the plurality of rendering images being a plurality of frame images in a video.

According to one or more embodiments of the present disclosure, an image processing apparatus is provided. The image processing apparatus includes: a text obtaining module configured to obtain a to-be-displayed text; a first base image generating module configured to generate a first base image including the to-be-displayed text; a second base image generating module configured to generate a second base image by determining, based on a display time parameter of the to-be-displayed text, a transparency of the to-be-displayed text in the first base image; a burr effect image generating module configured to generate, based on the second base image, a burr effect image of a to-be-displayed character; an external luminous effect image generating module configured to generate, based on the burr effect image, an external luminous effect image of the to-be-displayed character; a rendering image generating module configured to obtain a rendering image by superimposing the burr effect image and the external luminous effect image; and a character transparency determining module configured to determine a transparency of a to-be-displayed character in the rendering image based on a position parameter of the to-be-displayed character in the to-be-displayed text, a time stamp, and the display time parameter of the to-be-displayed text.

Further, the second base image generating module is further configured to: obtain the time stamp as a random number seed; obtain an index value of the to-be-displayed character in the to-be-displayed text; and determine the transparency of the to-be-displayed character by calculating a random number based on the random number seed, the index value, the time stamp, and the display time parameter of the to-be-displayed text.

Further, the burr effect image generating module is further configured to: obtain a noise image; obtain a gray scale value of a first coordinate position in the noise image; determine a second coordinate position based on the first coordinate position and the gray scale value; and determine a color value of the second coordinate position in the second base image as a color value of a first coordinate position in the burr effect image.

Further, the burr effect image generating module is further configured to: determine the color value of the second coordinate position in the second base image as a color value of a first coordinate position in an initial burr effect image; obtain an edge image by extracting an edge of a to-be-displayed text in the initial burr effect image and set the edge to have a first transparency; and obtain the burr effect image by blending the edge image with the initial burr effect image.

Further, the external luminous effect image generating module is further configured to: obtain an expansion image by performing an expansion processing on the burr effect image; obtain a luminous effect image by performing a Gaussian blur processing on the expansion image; and generate the external luminous effect image based on the luminous effect image.

Further, the external luminous effect image generating module is further configured to: generate, based on the first base image, a mask image of the to-be-displayed text; and generate the external luminous effect image by subtracting a color value of a pixel in the mask image from a color value of a pixel in the luminous effect image, the pixel in the mask image being at a position corresponding to the pixel in the luminous effect image.

Further, the character transparency determining module is further configured to: calculate a first parameter based on the time stamp and the display time parameter of the to-be-displayed text, the first parameter gradually increasing with the time stamp, and set the to-be-displayed character corresponding to the position parameter greater than the first parameter to have a second transparency; or the character transparency determining module is further configured to: calculate a second parameter based on the time stamp and the display time parameter of the to-be-displayed text, the second parameter gradually decreasing with the time stamp, and set the to-be-displayed character corresponding to the position parameter greater than the second parameter to have the second transparency.

Further, the image processing apparatus is further configured to: generate a plurality of rendering images based on the time stamp. The plurality of rendering images is a plurality of frame images in a video.

According to one or more embodiments of the present disclosure, an electronic device is provided. The electronic device includes at least one processor; and a memory in a communication connection to the at least one processor. The memory has instructions stored thereon and executable by the at least one processor. The instructions, when executed by the at least one processor, cause the at least one processor to perform the image processing method described in any implementation of the above first aspect.

According to one or more embodiments of the present disclosure, a non-transitory computer-readable storage medium is provided. The non-transitory computer-readable storage medium has computer instructions stored thereon. The computer instructions are configured to cause a computer to perform the image processing method described in any implementation of the above first aspect.

The above is only intended to explain the preferred embodiments of the present disclosure and the employed principles of technology. It will be appreciated by those skilled in the art that the scope of the present disclosure herein is not limited to the technical solutions formed by the specific combinations of the above technical features, but should also encompass other technical solutions formed by any other combinations of features described above or equivalents thereof without departing from the above concepts of the present disclosure. For example, the above features and the technical features having similar functions (but not limited thereto) as disclosed in the present disclosure can replaced with each other to form the technical solutions.

What is claimed is:

1. An image processing method, comprising:
   obtaining a to-be-displayed text;
   generating a first base image comprising the to-be-displayed text;
   setting, based on a display time parameter of the to-be-displayed text, a transparency of the to-be-displayed text in the first base image to generate a second base image;
   generating, based on the second base image, a burr effect image of a to-be-displayed character;
   generating, based on the burr effect image, an external luminous effect image of the to-be-displayed character;
   obtaining a rendering image by superimposing the burr effect image on the external luminous effect image; and
   determining a transparency of a to-be-displayed character in the rendering image based on a position parameter of the to-be-displayed character in the to-be-displayed text, a time stamp, and the display time parameter of the to-be-displayed text.

2. The image processing method according to claim 1, wherein said generating the second base image by determining, based on the display time parameter of the to-be-displayed text, the transparency of the to-be-displayed text in the first base image comprises:
   obtaining the time stamp as a random number seed;
   obtaining an index value of the to-be-displayed character in the to-be-displayed text; and
   determining the transparency of the to-be-displayed character by calculating a random number based on the random number seed, the index value, the time stamp, and the display time parameter of the to-be-displayed text.

3. The image processing method according to claim 2, wherein:
   the display time parameter comprises a display start time and a display end time of the to-be-displayed text;
   the display start time indicates a time when a displaying of the to-be-displayed text starts; and the display end time indicates a time when the displaying of the to-be-displayed text ends.

4. The image processing method according to claim 2, wherein the index value of the to-be-displayed character indicates a position of the to-be-displayed character in the to-be-displayed text.

5. The image processing method according to claim 1, wherein said generating, based on the second base image, the burr effect image of the to-be-displayed character comprises:
   obtaining a noise image;
   obtaining a gray scale value of a first coordinate position in the noise image;
   determining a second coordinate position based on the first coordinate position and the gray scale value; and
   determining a color value of the second coordinate position in the second base image as a color value of a first coordinate position in the burr effect image.

6. The image processing method according to claim 5, wherein said determining the color value of the second coordinate position in the second base image as the color value of the first coordinate position in the burr effect image comprises:
   determining the color value of the second coordinate position in the second base image as a color value of a first coordinate position in an initial burr effect image;
   obtaining an edge image by extracting an edge of a to-be-displayed text in the initial burr effect image and setting the edge to have a first transparency; and
   obtaining the burr effect image by blending the edge image with the initial burr effect image.

7. The image processing method according to claim 1, wherein said generating, based on the burr effect image, the external luminous effect image of the to-be-displayed character comprises:
   obtaining an expansion image by performing an expansion processing on the burr effect image;
   obtaining a luminous effect image by performing a Gaussian blur processing on the expansion image; and
   generating the external luminous effect image based on the luminous effect image.

8. The image processing method according to claim 7, wherein said generating the external luminous effect image based on the luminous effect image comprises:
   generating, based on the first base image, a mask image of the to-be-displayed text; and
   generating the external luminous effect image by subtracting a color value of a pixel in the mask image from a color value of a pixel in the luminous effect image, the pixel in the mask image being at a position corresponding to the pixel in the luminous effect image.

9. The image processing method according to claim 1, wherein said determining the transparency of the to-be-displayed character based on the position parameter of the to-be-displayed character in the to-be-displayed text, the time stamp, and the display time parameter of the to-be-displayed text comprises:
   calculating a first parameter based on the time stamp and the display time parameter of the to-be-displayed text, the first parameter gradually increasing with the time stamp; and setting the to-be-displayed character corresponding to the position parameter greater than the first parameter to have a second transparency; or
   calculating a second parameter based on the time stamp and the display time parameter of the to-be-displayed text, the second parameter gradually decreasing with the time stamp; and setting the to-be-displayed character corresponding to the position parameter greater than the second parameter to have the second transparency.

10. The image processing method according to claim 1, further comprising:
    generating a plurality of rendering images based on the time stamp, the plurality of rendering images being a plurality of frame images in a video.

11. The image processing method according to claim 1, wherein said generating a first base image comprising the to-be-displayed text comprises:
    typesetting a texture image of the to-be-displayed text based on a predetermined style; and
    rendering the texture image in an image with a transparent background,
    wherein the predetermined style is a vertical typesetting or a horizontal typesetting, and wherein the texture image is obtained from a set of character-texture images.

12. An electronic device, comprising:
    a memory having non-temporary computer-readable instructions stored thereon; and
    a processor,
    wherein the non-temporary computer-readable instructions, when executed by the processor, cause the processor to implement an image processing method,
    the image processing method comprising:
    obtaining a to-be-displayed text;
    generating a first base image comprising the to-be-displayed text;
    setting, based on a display time parameter of the to-be-displayed text, a transparency of the to-be-displayed text in the first base image to generate a second base image;
    generating, based on the second base image, a burr effect image of a to-be-displayed character;
    generating, based on the burr effect image, an external luminous effect image of the to-be-displayed character;
    obtaining a rendering image by superimposing the burr effect image on the external luminous effect image; and
    determining a transparency of a to-be-displayed character in the rendering image based on a position parameter of the to-be-displayed character in the to-be-displayed text, a time stamp, and the display time parameter of the to-be-displayed text.

13. The electronic device according to 12, wherein said generating the second base image by determining, based on the display time parameter of the to-be-displayed text, the transparency of the to-be-displayed text in the first base image comprises:
    obtaining the time stamp as a random number seed;
    obtaining an index value of the to-be-displayed character in the to-be-displayed text; and
    determining the transparency of the to-be-displayed character by calculating a random number based on the random number seed, the index value, the time stamp, and the display time parameter of the to-be-displayed text.

14. The electronic device according to 12, wherein said generating, based on the second base image, the burr effect image of the to-be-displayed character comprises:
    obtaining a noise image;
    obtaining a gray scale value of a first coordinate position in the noise image;
    determining a second coordinate position based on the first coordinate position and the gray scale value; and determining a color value of the second coordinate position in the second base image as a color value of a first coordinate position in the burr effect image.

15. The electronic device according to 14, wherein said determining the color value of the second coordinate position in the second base image as the color value of the first coordinate position in the burr effect image comprises:
determining the color value of the second coordinate position in the second base image as a color value of a first coordinate position in an initial burr effect image;
obtaining an edge image by extracting an edge of a to-be-displayed text in the initial burr effect image and setting the edge to have a first transparency; and
obtaining the burr effect image by blending the edge image with the initial burr effect image.

16. The electronic device according to 12, wherein said generating, based on the burr effect image, the external luminous effect image of the to-be-displayed character comprises:
obtaining an expansion image by performing an expansion processing on the burr effect image;
obtaining a luminous effect image by performing a Gaussian blur processing on the expansion image; and
generating the external luminous effect image based on the luminous effect image.

17. The electronic device according to 16, wherein said generating the external luminous effect image based on the luminous effect image comprises:
generating, based on the first base image, a mask image of the to-be-displayed text; and
generating the external luminous effect image by subtracting a color value of a pixel in the mask image from a color value of a pixel in the luminous effect image, the pixel in the mask image being at a position corresponding to the pixel in the luminous effect image.

18. The electronic device according to 12, wherein said determining the transparency of the to-be-displayed character based on the position parameter of the to-be-displayed character in the to-be-displayed text, the time stamp, and the display time parameter of the to-be-displayed text comprises:
calculating a first parameter based on the time stamp and the display time parameter of the to-be-displayed text, the first parameter gradually increasing with the time stamp; and setting the to-be-displayed character corresponding to the position parameter greater than the first parameter to have a second transparency; or
calculating a second parameter based on the time stamp and the display time parameter of the to-be-displayed text, the second parameter gradually decreasing with the time stamp; and setting the to-be-displayed character corresponding to the position parameter greater than the second parameter to have the second transparency.

19. The electronic device according to 12, wherein the image processing method further comprises:
generating a plurality of rendering images based on the time stamp, the plurality of rendering images being a plurality of frame images in a video.

20. A non-transitory computer-readable storage medium, comprising non-temporary computer-readable instructions, wherein the non-temporary computer-readable instructions, when executed by a computer, cause the computer to implement an image processing method,
the image processing method comprising:
obtaining a to-be-displayed text;
generating a first base image comprising the to-be-displayed text;
setting, based on a display time parameter of the to-be-displayed text, a transparency of the to-be-displayed text in the first base image to generate a second base image;
generating, based on the second base image, a burr effect image of a to-be-displayed character;
generating, based on the burr effect image, an external luminous effect image of the to-be-displayed character;
obtaining a rendering image by superimposing the burr effect image on the external luminous effect image; and
determining a transparency of a to-be-displayed character in the rendering image based on a position parameter of the to-be-displayed character in the to-be-displayed text, a time stamp, and the display time parameter of the to-be-displayed text.

* * * * *